T. E. MENDENHALL.
Portable Rock-Drilling Machines.
No. 157,969. Patented Dec. 22, 1874.
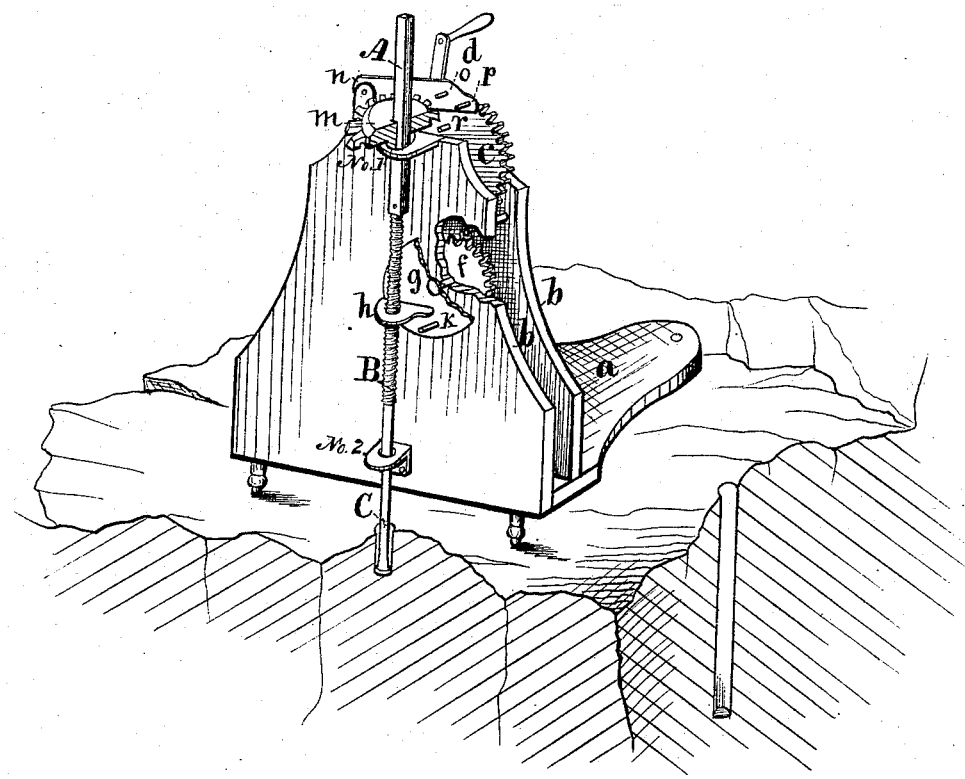
Witnesses.
C. C. Perkins
L. Perkins
Inventor, Thomas Elwood Mendenhall,
Attorney, Thomas G. Orwig.

UNITED STATES PATENT OFFICE.

THOMAS E. MENDENHALL, OF OSKALOOSA, IOWA.

IMPROVEMENT IN PORTABLE ROCK-DRILLING MACHINES.

Specification forming part of Letters Patent No. 157,969, dated December 22, 1874; application filed August 14, 1874.

*To all whom it may concern:*

Be it known that I, THOMAS ELWOOD MENDENHALL, of Oskaloosa, in the county of Mahaska and State of Iowa, have invented a Portable Rock-Drilling Machine, of which the following is a specification:

The object of my invention is to mount a drill upon a portable stand in such a manner that it will be automatically adjusted and operated by turning a wheel.

It consists in the combination of a driving-wheel, pinion, and cam-wheel, a drill, and adjusting devices, as hereinafter fully set forth.

My drawing is a perspective view, illustrating the construction and operation of my invention.

*a* represents the base of the portable stand, of triangular form, with suitable feet attached. *b b* are two parallel uprights, tapering toward their tops, rigidly attached to the edge of the base *a*.

This stand may be made of wood, and joined together in any suitable way; or it may be cast in parts, and bolted together, or cast complete in one piece. It may be solid, or open skeleton work, and vary in dimensions and ornamental design, as desired.

A is the top or shank of the drill, in the form of a square bar. B is a section of the drill in the form of a screw. C is the shaft of the drill. Nos. 1 and 2 are suitable guides or bearers, attached to the upright *b*, through which the drill is operated. *c* is a toothed driving-wheel, mounted in suitable bearings fixed in the uprights *b b*. *d* is a crank, by which motion is imparted to the wheel *c*.

A belt-wheel or gearing may be substituted for the crank, so that the drill can be operated by steam or any other suitable motor.

*f* is a pinion, that also has its bearings in the uprights *b b*. It engages the wheel *c* and is operated thereby. *g* is a crank-wheel outside of the first upright *b*, and rigidly attached to the axle of the pinion *f*. *h* is a nut on the screw-section B of the drill. This nut *h* has a finger extending to the right to engage the crank-pin *k* on the wheel *g*. A roller on the pin *k* prevents friction with the finger of the nut *h*.

To facilitate the moving of the nut *h* on the screw B, it may be formed in sections and keyed, or otherwise locked together, so that it can be readily opened and adjusted relatively to the point of the drill, as required, to be kept operative as a drill-feeding device.

*m* is a wheel, with cogs of peculiar form, mounted in a horizontal position upon the drill-bearer No. 1. It has an opening through its center corresponding with the shank of the drill which passes through it. *n* is a bar, pivoted to the left side and top of the first upright *b*, and carries projecting pins *o* and *p*. *r* is a pin or cam projecting from the side of the driving-wheel *c*.

Two or more may be used as parts of the adjusting device.

In the operation of my invention, the stand is placed upon the rock in a position to bring the point of the drill where the bore is desired. Turning the wheel *c* imparts motion to the crank-wheel *g* through the pinion *f*. Every revolution of the crank *g* causes the pin *k* to engage the finger of the nut *h*, and thereby lift the drill and instantly drop it again when the pin passes the finger. The drill is thus alternately raised and dropped to strike successive blows, by force of gravity, to cut a bore into the rock. The cams *r* on the wheel *c* strike the pivoted bar *n*, and lift it so as to disengage its pin *o* from the cam-wheel *m*, which was locked thereby. The same cam *r*, when it has unlocked the wheel *m*, engages one of its peculiarly-shaped cogs, and moves the wheel *m*, and thereby turns the drill in its bore, so that it will strike the rock in a different position every time, as required to drill a round bore; and by thus turning the drill, its screw-section B is operated in the nut *h*, so that the position of the nut is changed at every turn and blow of the drill, to feed the drill and set it to strike every successive blow deeper into the rock. When the nut *h* reaches the top of the screw-section, it must be lowered again to perform its function as a drill-feeder.

I am aware that drills have been mounted and operated by gearing, and fed by means of a screw; but I claim that my manner of mounting, arranging, and combining the mechanism is new and advantageous.

I claim as my invention—

In a rock-drill, actuated by the gearing mounted in the stand $a$ $b$, the combination of the cam-wheel $m$ and nut $h$ on the drill A B C with the pivoted bar $n$, having pins $o$ and $p$, and the wheel $c$ having a pin, $r$, substantially as described, as a means of turning and feeding the drill.

THOMAS ELWOOD MENDENHALL.

Witnesses:
J. K. JOHNSON,
DAVID W. LUPTON.